3,281,225
METHOD OF INCREASING THE DURABILITY OF GLASSWARE

James J. Hazdra, Joliet, and Arthur S. Gunderson, Lockport, Ill., assignors to Brockway Glass Company, Inc., Brockway, Pa.
No Drawing. Filed Sept. 30, 1965, Ser. No. 491,902
8 Claims. (Cl. 65—30)

This application is a continuation-in-part of application Serial No. 157,839 filed December 7, 1961, and now abandoned.

The present invention relates to a method of treating glassware so as to remove surface alkalinity therefrom.

The invention is more particularly related to an improved method of removing surface alkalinity from the interior surfaces of glass containers such as are to be used in the storage of pharmaceutical or medicinal products.

During the formation of glass containers, small amounts of alkali, normally in the form of sodium or other alkali metal compounds, are brought to the surface of the glassware. Water and other liquids commonly placed in glass containers, upon storage will often leach out alkalies present at the alkali-rich glass surfaces. For many purposes to which glass containers are normally put, the small amounts of alkali found at the surface of glass containers will not be harmful. When the glass containers are, however, used to store medicinal or pharmaceutical preparations the leashing of surface alkali into the medicinal or pharmaceutical preparation can be extremely harmful in many cases. For this reason, the interior surface alkalinity of pharmaceutical or medicinal glass containers should be kept to a minimum.

The ability of glassware to resist leaching by the water or liquids often stored therewithin is commonly termed the "chemical durability" of glass containers. This invention, therefore, relates to a method of improving the chemical durability of glass containers.

Tests and standards for determining the durability of glassware have been set up the U.S. Pharmacopeia, which standards must be successfully met before glass containers will be acceptable for the storage of pharmaceutical or medicinal preparations. Such a standard or test (Type II) is set out in the U.S. Pharmacopeia XVI, pages 918–920 (1960). This test is based upon the fact that hot high purity water placed in such containers will pick up or leach alkalies and can thereafter be titrated against an acid so as to determine the amount of alkali picked up by the water. Such a procedure comprises autoclaving a sealed glass container having high purity water therein. The water contained in the glassware is then titrated against 0.02 N sulfuric acid using methyl red as an indicator to determine the increase of alkalinity of the water. This procedure provides a base or standard that can be used in determining the amount of reactive material to be placed within glassware containers for satisfactorily reducing the therein contained surface alkalinity to such an extent that they will qualify under the U.S. Pharmacopeia test.

Several different methods and materials for removing glass-surface alkalinity have been or now are being used. These materials are acidic of themselves or, upon heating, will decompose or pyrolyze into said gases which either by themselves or in combination with water to form acid substances therefrom, will combine with the alkalies present at the surface glassware to react therewith. These previous methods are satisfactory in removing surface alkalinity. However, they are subject to undesirable characteristics which limit their commercial use.

One such material that has been commonly used is sulfur trioxide gas, usually introduced into or formed within an annealing lehr wherein the glassware is being treated so as to create an acid gas atmosphere therein. However, with this method of utilizing sulfur trioxide gas, it has been very difficult to effectively reach the interior surfaces of glass containers, since the containers enter the lehr filled with air which must be displaced. A further practical consideration is that the gas is extremely hazardous and difficult to confine in plant operational equipment, which limits its commercial use in the above form. Sometimes, when small glassware containers for which the interior surfaces must have their alkalinity reduced, sulfur either in the form of pellets or powder has been introduced therein. The sulfur upon heating and in the presence of oxygen will react to form sulfur trioxide. Any unreacted sulfur at the end of this process is difficult to remove from the interior of the glass container. Sulfur also produces exteremely low yields of sulfur trioxide. Sulfur dioxide gas had been utilized in the same manner as elemental sulfur. The yields of sulfur trioxide from sulfur dioxide are low because the activation energy of the oxidation of sulfur dioxide is too high. For efficient conversion the presence of a catalyst is required. Sulfur dioxide is also unpleasant to smell and presents toxicity problems. In addition, sulfur dioxide when used to saturate the lehr atmosphere is adsorbed by the refractories in the lehr. The adsorbed gases slowly evolve to put an undesirable sodium sulfate bloom on the outside of glass containers being annealed in the lehr for a day or two after the actual use of sulfur dioxide was terminated.

Another acidic material that has been used in aluminum chloride; however, aluminum chloride is very hydroscopic and is therefore handled with much difficulty under atmospheric conditions. Ferric sulfate has also been utilized to some degree. Upon decomposition, ferric sulfate yields not only sulfur trioxide, but also water insoluble ferric oxide which presents problems of removal from the inside of the glass container upon completion of the surface alkalinity removal operation. Ammonium salts containing both sulfur and oxygen such as ammonium sulfate, ammonium bisulfate, or ammonium thiosulfate have also been utilized and, as in the above mentioned procedures the ammonium compounds are satisfactory in removing surface alkalinity of glassware. The ammonia gas, however, produced during the decomposition of the ammonium compounds, is not consumed in the dealkalization process. Ammonia, although not so toxic as sulfur dioxide gas, is extremely noxious.

It is therefore an object of this invention to provide an improved method of reducing the surface alkalinity of glass containers so that glass containers so treated will pass the U.S. Pharmacopoeia Type II test, without the undesirable effects of prior art practice.

Another object of this invention is to provide an improved method of reducing the interior surface alkalinity of glass containers by introducing into such glass containers an oxygen and sulfur containing material, which when heated will release an active agent capable of reacting with the glass surface alkalies to form a water soluble product.

Another object of this invention is to provide an improved method of reducing the interior surface alkalinity of glass containers by introducing into such glass containers an oxygen and sulfur containing material, which when heated will form a water soluble salt and sulfur trioxide which reacts with the glass surface alkalies to later form a further water soluble salt.

A further object of this invention is to provide an improved method of reducing the interior surface alkalinity of glass containers by introducing into the interior of such glass containers a material which when heated releases products which are ultimately consumed including an active agent capable of reacting with the glass surface alkalies to reduce the alkalinity of such glass surfaces.

Another object of this invention is to provide an improved method of reducing the interior surface alkalinity of glass containers by introducing into such glass containers an oxygen and sulfur containing material, which when heated is completely consumed by such heating to produce a high yield of an active agent capable of reacting with surface alkalies to form water soluble salts.

A still further object of this invention is to provide an improved method of increasing the chemical durability of glassware by introducing a heat decomposable non-volatile alkali metal acid sulfate into glassware containers whereon upon heating, such material is entirely consumed and produces in situ sulfur trioxide gas, which reacts with surface glass alkalies to form water soluble sulfate salts.

The specific nature of this invention, as well as other objects and advantages thereof, will become apparent from the following detailed description.

As an aid in understanding the present invention reference is had to the following basic equations:

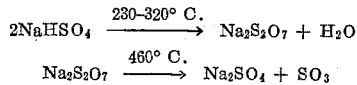

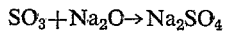

As can be seen from the above equations sodium bisulfate upon heating will dehydrate into sodium pyrosulfate. The sodium pyrosulfate in turn upon further application of heat will pyrolyze to sodium sulfate and sulfur trioxide. Therefore, by placing sodium bisulfate in glass containers and heating, a high yield of sulfur trioxide is produced by the pyrolysis of the sodium bisulfate and is available in situ to react with the alkaline oxides at the surface of the glass container as shown in the following representative equation:

$$SO_3 + Na_2O \rightarrow Na_2SO_4$$

All the by-products of the above reactions that remain on the surface of the glass containers are water soluble and thus present no problem as to their removal, that is, the sodium sulfate produced by the pyrolysis of the sodium pyrosulfate as well as the sodium sulfate produced by the dealkalization reaction is highly water soluble (48.8 grams in 100 ml. of $H_2O$). The exact amount of sulfur trioxide needed for the dealkalization reaction with the glassware surface alkalies can be controlled by the amount of sodium bisulfate originally placed in the container, provided the reaction temperature of 460° C. or above is maintained; and if desired, by regulating time and temperature if temperatures below 460° C. are utilized to decompose the sodium bisulfate. High yields of sulfur trioxide (approximately 95%) are obtained in about 5 minutes' duration when sodium bisulfate is placed into containers which are at temperatures of 460° C. or above.

For every mole of sulfur trioxide needed for the dealkalization reaction, as determined by the tests set out in the U.S. Pharmacopeia, at least two moles of sodium bisulfate should be utilized. That is, for every mole of alkaline (e.g. sodium) material on the interior surface of the glass container, at least two moles of sodium bisulfate are needed.

Instead of utilizing sodium bisulfate to form sodium pyrosulfate which later pyrolyzes to sulfur trioxide, the sodium pyrosulfate may be used directly. The potassium salts (potassium bisulfate and potassium pyrosulfate) and the lithium salts (lithium bisulfate and lithium pyrosulfate) have been found effective by similar reactions to the above. The sulfur and oxygen containing material can be applied in a spray solution and concentrated solutions which tend to form a cling coating may be employed as the above mentioned salts are highly water soluble. Through spray application and subsequent drying a uniform layer of the reactant salt can be placed upon the glass surface to obtain immediate contact of the pyrolytic sulfur trioxide therefrom produced upon pyrolysis with the alkaline material present at the surface of the glassware and thus has the advantage of localized action.

Examples of the present invention are as follows:

*Example I*

Twenty-four randomly selected previously untreated 0.132 ounce soda-lime glass vials were filled with special distilled water, sealed and autoclaved in the manner set forth in the U.S. Pharmacopeia. This water was collected from the vials and then titrated against .02 normal sulfuric acid. It required 6 ml. of the sulfuric acid to neutralize the alkaline sodium material leached from the interior surfaces of the untreated glass vials during the autoclaving. That is, 0.00012 equivalents of alkaline sodium material or 0.00024 mole of sodium ions were present at the interior surface of the glass vials. Since two moles of sodium bisulfate are need to produce one mole of sulfur trioxide, 0.00048 mole of anhydrous sodium bisulfate are needed to neutralize the alkaline material present at the surfaces of the 24 vials. This amounts to 0.059 gram of anhydrous sodium bisulfate or 0.067 gram of sodium bisulfate monohydrate per 24 vials or 0.0027 gram for each vial. Thereupon, another group of randomly selected twenty-four 0.132 ounce vials from the same batch were internally sprayed with a 27% water solution of sodium bisulfate. The average weight of the salt in each bottle was 3.3 milligrams to assure sufficient dealkalization. The bottles were heated to approximately 538° C. for 10 minutes and then slowly cooled to room temperature and subsequently washed. Chemical durability tests were carried out under the U.S. Pharmacopeia Type II test and each vial was found to be acceptable.

Similarly, each bottle can receive the required amount of sodium bisulfate in the form of a dry powder, with agitation to form a layer of dust on the interior surface, then heating as before to provoke the formation of sulfur trioxide and its reaction with the surface alkalies followed by the washing.

*Example II*

A group of soda-lime glass containers were taken from a commercial forming machine and similarly tested as the vials of Example I to determine the amount of alkalinity present on the interior surfaces of the containers. From the thus determined amount of alkalinity present in the interior surfaces of the containers, the amount of sodium bisulfate required was similarly determined as in Example I and was found to be 6.9 milligrams for each container. Further glass containers of the same type as they emerged from the same forming machine were internally sprayed with a water solution of sodium bisulfate which contained 6.9 milligrams of the salt by a timed spray device mounted on the take out arm of the container forming machine. The interior temperature of the container was determined to be approximately 650° C. at the time of the spray application. The containers were then conveyed through an annealing lehr, cooled and tested for chemical durability under the U.S. Pharmacopeia Type II test. Each container was found to be acceptable.

What is claimed is:

1. A method of preparing a glass surface of reduced alkalinity by removing from the surface the alkali metal ions which comprises contacting the glass surface with an effective amount of an alkali-metal sulfur oxide compound selected from the group consisting of sodium pyrosulfate, sodium bisulfate, potassium bisulfate, potassium pyrosulfate, lithium bisulfate and lithium pyrosulfate; said compound characterized as a stable solid at room temperature and decomposes at temperatures above 460° C. to sulfur trioxide and a metal salt, and heating said glass surface in contact with the alkali-metal sulfur oxide compound to a temperature above 460° C. and below the melting point of the glass for a period sufficient to form sulfur trioxide which reacts with the alkali metal ions in the surface of the glass to form water-soluble salts; said water-soluble salts subsequently being removed to obtain the reduced alkalinity glass surface.

2. The method of claim 1 further characterized in that the glass surface in contact with the alkali-metal sulfur oxide compound is a soda-lime glass.

3. The method of claim 2 further characterized in that the sulfur oxide compound is sodium pyrosulfate.

4. The method of claim 2 further characterized in that the sulfur oxide compound is potassium pyrosulfate.

5. The method of claim 2 further characterized in that the sulfur oxide compound is lithium pyrosulfate.

6. The method of claim 1 further characterized in that the glass surface is heated prior to being contacted with the alkali-metal sulfur oxide compound.

7. The process of claim 1 further characterized in that the glass surface is contacted with an aqueous solution of the sulfur oxide compound.

8. The method of claim 1 further characterized in that the glass surface is contacted with a dry powder of the sulfur oxide compound.

No references cited.

JACOB H. STEINBERG, *Primary Examiner.*